Dec. 23, 1958    L. V. GUILD    2,865,720
CARTRIDGE FOR ABSORBING $CO_2$
Original Filed Nov. 13, 1951    2 Sheets-Sheet 1

INVENTOR.
Lloyd V. Guild
BY
HIS ATTORNEYS

Dec. 23, 1958     L. V. GUILD     2,865,720
CARTRIDGE FOR ABSORBING $CO_2$
Original Filed Nov. 13, 1951     2 Sheets-Sheet 2

INVENTOR.
Lloyd V. Guild
BY
HIS ATTORNEYS

United States Patent Office
2,865,720
Patented Dec. 23, 1958

2,865,720

CARTRIDGE FOR ABSORBING CO₂

Lloyd V. Guild, Library, Pa.

Original application November 13, 1951, Serial No. 255,928, now Patent No. 2,746,845, dated May 22, 1956. Divided and this application April 4, 1956, Serial No. 576,033

1 Claim. (Cl. 23—284)

This application is a division of my copending application, Serial No. 255,928, filed November 13, 1951, now Patent No. 2,746,845, which relates to a carbon train.

This invention relates to a CO₂ absorbing cartridge used in a carbon train which analyzes carbon in a sample of metal by combustion of the sample and by passage of the gases of combustion through the carbon train.

The accurate analysis of carbon in metals is an essential requirement in many metallurgical processes. A standard method of analysis for the carbon content has been in common use among steel chemists for many years. While many variations and modifications are in use, the essentials of the analysis procedure are as follows: A weighed sample of metal is placed in a tube-type furnace at approximately 2000° F., and burned in a stream of oxygen. The gaseous products of combustion consist of carbon dioxide, oxides of sulphur, and water vapor mixed with excess oxygen. The carbon dioxide present is due to the combustion of the carbon in the sample, and represents a measure of the carbon content of the metal. The oxides of sulphur and water vapor are removed chemically. The carbon dioxide is then removed chemically in a weighed container, and the quantity of carbon dioxide determined gravimetrically by the increase in weight. This is used to determine the percent of carbon in the sample in a known manner.

The equipment used is generally considered in terms of the combustion furnace for the combustion of the samples and the absorption vessels for the removal of water vapor, oxides of sulphur and carbon dioxide. The combination of absorption vessels is generally referred to as the carbon train.

A cartridge for absorbing CO₂ in a carbon train performs two functions. First, it absorbs the CO₂ from the gas passing therethrough and second, it absorbs the water produced from a reaction between the CO₂ of the gas and an absorbent for the CO₂. To perform these two functions, the cartridge has two absorbent bodies, one for the CO₂ and the other for the water or moisture, one of the products of the reaction between the CO₂ and the absorbent therefor. Usually, the absorbent body for the CO₂ is sodium or potassium hydroxide in some form. This absorbent body reacts with the carbon dioxide in the gas according to the following equation:

$$2NaOH + CO_2 \rightarrow Na_2CO_3 + H_2O$$

Downstream from the absorbent body for the CO₂ in the cartridge is a drier or an absorbent for the moisture produced from the above reaction. The absorbent for the water is a material such as phosphorus pentoxide or magnesium perchlorate. Since water is a product of the CO₂ absorption reaction, it is essential to capture in the drier within the cartridge all the water produced in this absorption reaction. If some of the water from the absorption reaction were to escape from the cartridge, the weight of the cartridge would be changed other than by the absorption of the CO₂, thereby making accurate analysis impossible.

In order for the CO₂ absorbent material to be active, it must have a certain amount of moisture. Heretofore, on long standing, the drier has removed the moisture from the CO₂ absorbent, thereby rendering the cartridge inactive and in addition, by such moisture removal making itself unable to remove moisture formed from the CO₂ absorbent reaction. Consequently, the CO₂ cartridges used before my invention could not be stored for long periods of time but required usage while fresh.

My invention provides a cartridge for absorbing carbon dioxide which cartridge can be stored for long periods of time without loss of effectiveness. Specifically, my cartridge comprises a container with an inlet and an outlet for the gas passing therethrough. In the container is an absorbent for the carbon dioxide and an absorbent for the moisture produced by the CO₂ absorption reaction located downstream of the carbon dioxide absorbent. Interposed between the carbon dioxide absorbent and the absorbent for the moisture is a valve or diaphragm which opens when the cartridge is in use but which seals off the carbon dioxide absorbent from the moisture absorbent when the cartridge is not in use.

In the accompanying drawings which illustrate a preferred embodiment of my invention—

Figure 1:
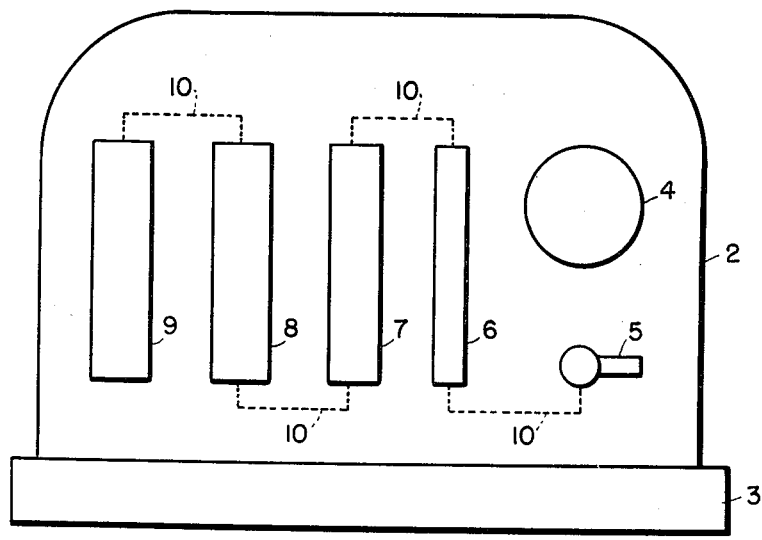
Figure 1 is a front elevation of a carbon train mounted on a mounting panel, the drawing being somewhat diagrammatic.
Figure 2:
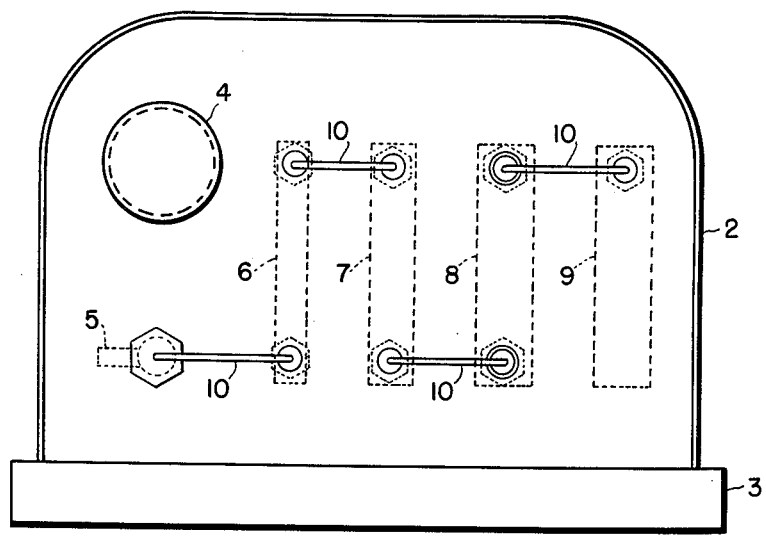
Figure 2 is a rear elevation of the apparatus shown in Figure 1.

Referring to the accompanying drawings, and for the present to Figures 1 and 2, a metal panel 2 is mounted on a base 3. An electric timing device 4 used for controlling the time of combustion and the flushing of the train is mounted on the panel 2. The inlet 5 to the carbon train is connected to the combustion furnace by a short rubber tube connection not shown. Four glass absorption vessels or cartridges 6, 7, 8 and 9 are mounted on the panel 2. The cartridge 6 contains a material such as manganese dioxide for the removal of the oxides of sulphur. Cartridge 7 contains a material such as phosphorous pentoxide or magnesium perchlorate for the removal of water vapor. Cartridge 8 contains a material such as soda lime or "Ascarite," which is a sodium hydroxide-asbestos preparation, the function of which is to absorb carbon dioxide. Vessel 9 is a sulphuric acid trap sealing the train from the atmosphere and is so constructed as to prevent the sucking of any air back into the absorption cartridge 8. The various parts of the carbon train are connected as shown by the dotted lines 10 of Figure 1. These connections 10 between the various vessels 6—9 are made of metal tubing which is welded to metal fixtures supported by the panel 2.

Figure 3:
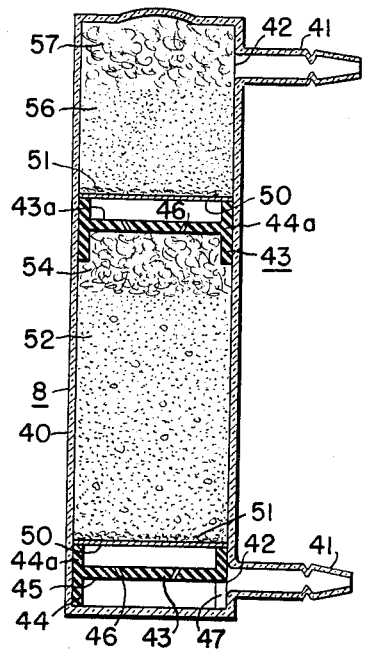
Figure 3 is a longitudinal section through a cartridge for absorbing CO₂.
Figure 4:
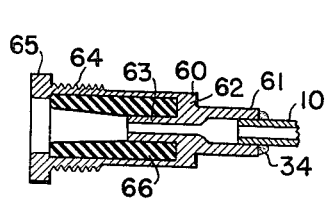
Figure 4 is a longitudinal section through one of the fittings used for mounting the cartridge of Figure 3 on a mounting panel.
Figure 5:
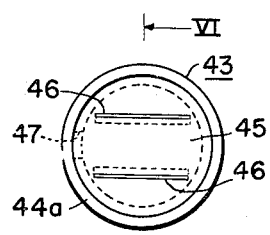
Figure 5 is a plan view of one of the resilient diaphragms used in the cartridge shown in Figure 3.
Figure 6:
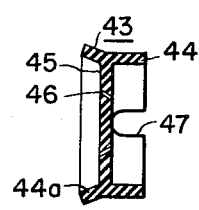
Figure 6 is a vertical section taken on the line VI—VI of Figure 5.

The absorption tower or cartridge 8 for absorbing CO₂ is shown in Figures 3, 5 and 6 and one of the fittings used for supporting it on the panel 2 is shown in Figure 4. Referring to these figures, the CO₂ cartridge 8 consists of a glass vessel 40, provided adjacent its top and bottom with side arms 41 having openings 42 communicating with the interior of the cartridge. In the bottom end of the cartridge is a "Neoprene" or rubber diaphragm piece 43 constructed as shown in Figures 5 and 6. It consists of a ring 44 molded to a diaphragm 45 having two slits 46 cut in it. The upper part 44a of the ring 44 is enlarged or flared and fits tightly against the inside of the tube 40. A portion of the lower part of the ring 44 is cut away to provide an opening 47, which lies adjacent the opening 42 in the lower side arm 41. The slots 46 are elongated and, as shown in Figure 3, there are two slots which diverge from each other in an upwardly extending direction. In other words, the slots diverge from each other from the lower surface of the diaphragm 45 (the surface of the diaphragm facing toward the gas inlet 42) to the upper surface of the diaphragm 45 (the surface of the diaphragm facing toward the gas outlet 42). A metal or plastic gauze piece 50 is placed on top of the rubber piece 43 and a small portion 51 of glass wool is placed on top of the gauze 50. The absorbent 52 for $CO_2$ is placed on top of the glass wool 51. This absorbent can be soda lime or "Ascarite" or any one of a number of commercially available absorbents. On top of the absorbent 52 is a layer 54 of glass wool, and then there is another or upper diaphragm piece 43a. The upper diaphragm piece 43a is similar to the lower diaphragm piece 43 except that it does not have the opening 47. A piece 50 of gauze is placed on top of the upper diaphragm piece 43a and a small portion 51 of glass wool is placed on the gauze 50. Above the glass wool 51 is a body 56 of a material such as phorphorous pentoxide or magnesium perchlorate which absorbs moisture. A body 57 of glass wool is placed above the drier material 56.

The $CO_2$ absorbent body 52 is usually either sodium or potassium hydroxide in some form, which reacts with the carbon dioxide in the gas according to the following equation:

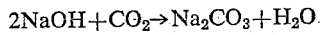

$$2NaOH + CO_2 \rightarrow Na_2CO_3 + H_2O$$

It can be seen that water is formed from the reaction. The purpose of employing the drier 56 is to prevent any of this water from being carried off and thus changing the weight, which would lead to an inaccurate analysis.

The upper diaphragm or valve 43a shown in Figure 5 gives my cartridge the ability to seal off the $CO_2$ absorbent material 52 from the moisture absorbent material 56 when the cartridge is not in use and the ability to permit flow of gas from the $CO_2$ absorbent to the moisture absorbent when the cartridge is in use. Thus, the $CO_2$ absorbent retains the requisite amount of moisture to render it active for the drier does not remove moisture therefrom and the drier itself retains its capacity to absorb moisture formed by the reaction between the $CO_2$ absorbent and the gas.

When the cartridge is in use, the outlet gases from the combustion furnace enter the inlet of the cartridge through the lower side arm 41, and due to the increased pressure, the slits 46 in the lower diaphragm 43 open, allowing the passage of gases upwardly through the $CO_2$ absorbent 52, through the opened slits in the upper diaphragm 43a and through the drier 56. However, when the cartridge is not in use, the pressure within the cartridge is reduced, and the slits 46 in the upper and lower diaphragm members 43 and 43a are closed, thereby causing the diaphragm member 43a to seal off the drier 56 from the $CO_2$ absorbent 52. The diaphragm 43 which is located in the bottom of the cartridge 8 serves to keep the absorbent 52 away from the inlet in the lower side arm 41, and also serves in use to break up the gas stream and to prevent channeling as the gases pass through the cartridge.

In addition to the diaphragm pieces 43 and 43a, other valves and diaphragms operate satisfactorily in my cartridge to seal off the drier from the $CO_2$ absorbent material when the cartridge is not in use and when in use, to open to permit a flow of combustion gases through the cartridge. These valves and diaphragms must have the ability to effectively seal off the drier from the $CO_2$ absorbent and the ability to open under pressures generated by the gases of combustion flowing through the carbon train.

The fitting for cartridge 8 is shown in Figure 4. This fitting comprises a metal tube 60 and a metal tube 61 of somewhat smaller diameter, joined together at 62 and provided with a forwardly extending portion 63. The tube 60 is threaded as shown by reference numeral 64 and is provided with a head 65 for threading the fitting into a threaded hole in the panel 2. A "neoprene" or rubber sleeve 66 fits within the tube 60, and is fitted at its base between the tube 60 and the tube 63. Tight seals are made by forcing the side arms 41 into contact with the resilient sleeve 66 of the fittings. The cartridge can be easily removed from the fittings for weighing.

In view of the foregoing, it is clear that my carbon dioxide cartridge has important advantages over those heretofore in use. In the first place, it can be stored for long periods of time without losing its effectiveness whereas the previous cartridges had to be used when fresh.

In the second place, users of my cartridge do not need to be continually concerned about the age of the cartridges in stock. Along with this concern is a tendency to continually order additional new cartridges, thereby keeping an inventory of cartridges larger than necessary.

In the third place, my cartridge tends to give more accurate results, especially where the carbon content of the gas is high because my cartridge preserves the effectiveness of both the $CO_2$ absorbent and the moisture absorbent by sealing off one absorbent from the other when the cartridge is not in use. On the other hand, the effectiveness of the other cartridges even though fresh, tend to be impaired by the drier absorbing some of the essential moisture from the $CO_2$ absorbent.

The invention is not limited to the preferred embodiments but can be otherwise embodied within the scope of the following claim.

I claim:

A cartridge for absorbing $CO_2$ from gas passing therethrough, said carriage comprising a container having an inlet and an outlet for gas, an absorbent for $CO_2$ in the container, and absorbent for moisture in the container located downstream of said $CO_2$ absorbent, a first valve interposed between said absorbent and a second valve located in said container between the gas inlet and said absorbent for $CO_2$, each of said valves being made of resilient material and comprising a diaphragm, a ring integral with said diaphragm and having a portion extending above and another portion extending below said diaphragm, a portion of said ring being flared outwardly to a greater diameter than said diaphragm for fitting tightly against the inside of said container, each of said valves having a plurality of elongated slits extending through said diaphragm, said slits diverging from each other from the surface of said diaphragm facing toward said inlet to the surface of said diaphragm facing toward said outlet, said second valve having an opening in said ring adjacent the inlet to said container.

References Cited in the file of this patent

UNITED STATES PATENTS

| | | |
|---|---|---|
| 156,908 | Brock | Nov. 17, 1874 |
| 1,414,194 | Levy | Apr. 25, 1922 |
| 1,422,211 | Lamb | July 11, 1922 |
| 2,402,741 | Draviner | June 25, 1946 |
| 2,644,663 | Klingler | July 7, 1953 |